United States Patent [19]

Kashiwaba

[11] Patent Number: 4,466,855

[45] Date of Patent: Aug. 21, 1984

[54] LABEL DELAMINATING AND APPLYING DEVICE

[75] Inventor: Tadao Kashiwaba, Iwate, Japan

[73] Assignee: Kabushiki Kaisha Sato, Japan

[21] Appl. No.: 347,590

[22] Filed: Feb. 10, 1982

[30] Foreign Application Priority Data

Feb. 17, 1981 [JP] Japan .................................. 56-20115

[51] Int. Cl.3 .......................... B44C 1/16; B32B 31/00; B31F 5/00

[52] U.S. Cl. ..................................... 156/541; 156/556; 156/584; 156/DIG. 48

[58] Field of Search ............... 156/540, 541, 385, 387, 156/584, 577, 556, DIG. 33, DIG. 42, DIG. 48; 101/292; 271/33, 306; 206/389

[56] References Cited

U.S. PATENT DOCUMENTS

| | | | |
|---|---|---|---|
| 3,582,434 | 6/1971 | Way | 156/385 |
| 3,814,651 | 6/1974 | Wada | 156/541 |
| 4,056,424 | 11/1977 | Hamisch, Jr. | 156/584 |
| 4,308,797 | 1/1982 | Becker et al. | 101/292 |
| 4,369,085 | 1/1983 | Hermann | 156/577 |
| 4,377,435 | 3/1983 | Fujita | 156/577 |

*Primary Examiner*—Edward C. Kimlin
*Assistant Examiner*—Louis Falasco
*Attorney, Agent, or Firm*—Ostrolenk, Faber, Gerb & Soffen

[57] ABSTRACT

The disclosure concerns a label applying device for delaminating each of a series of labels from their backing paper web and for applying the delaminated labels to articles. The label applying device has a grip which can be manually depressed and released to move an actuator up and down. On this actuator, there is carried a label applier which is brought into contact with each delaminated label to apply the same to an article. A link mechanism is hingedly connected to the actuator to transmit the depressing force of the actuator to a feed roller which is made operative to feed a composite label web a predetermined length and to effect the delamination of the labels from their backing paper web.

22 Claims, 4 Drawing Figures

LABEL DELAMINATING AND APPLYING DEVICE

FIELD OF THE INVENTION

The present invention relates to a label applying device for individually delaminating a series of labels, which are temporarily adhered to their backing paper web, and for applying the delaminated labels to articles.

BACKGROUND OF THE INVENTION

A composite label web comprises a plurality of labels printed with predetermined indicia which are temporarily adhered in series to a backing paper web. If the labels are to be adhered to articles of different sizes, they are applied to their desired positions on the respective articles by the hands of the operator after they have been delaminated. However, those operations take a relatively long time so that they are inefficient.

SUMMARY OF THE INVENTION

Accordingly, the object of the invention is to provide a device which can perform a series of operations of delaminating the labels from their backing paper web and applying them to articles.

Another object of the present invention is to provide a label applying device which is enabled by a single manual action to delaminate labels from their backing paper web and to apply the delaminated labels to articles.

Individual labels are arrayed in a series on a paper web which backs the series of labels to provide a composite label web.

According to the present invention, the actuator of the label applying device is movable together with the vertical movements of a hand grip. Attached to the actuator are both a label applier for applying the labels and a link mechanism for transmitting the depressing force of the grip to a feed roller which feeds a composite label web a predetermined length to a delminator which delaminates the labels from the backing paper web.

The label applying device delaminates a label from the paper web. The device applies the delaminated label to an article. The device comprises a label application operator for a series of label applying operations. There is an actuator adapted to be operated by the label application operator to move reciprocally between an initial position and an application stand-by position. A label applier is carried on the actuator so that it is brought from an initial position, when the actuator has not yet operated, to a label applying position in which it is in forced contact with the label to be applied. A link mechanism is hinged to the actuator. There is a label feed mechanism which includes a feed roller which is rotatable through the link mechanism for sequentially feeding the composite label web. A label delaminator delaminates the labels one by one from the backing paper web, while they are being fed and before they are applied.

BRIEF DESCRIPTION OF THE DRAWINGS

Other objects and features of the present invention will become apparent from the following description taken in conjunction with the accompanying drawings.

FIG. 3(*b*) is a view similar to FIG. 3(*a*) showing the operating mode when the link mechanism is in the course of its movement;

FIG. 3(*c*) is a view similar to FIGS. 3(*a*) and 3(*b*) showing the operating mode when the link mechanism is bent.

DESCRIPTION OF THE PREFERRED EMBODIMENT

The present invention is now described in connection with an embodiment shown in the accompanying drawings.

Figure 1:
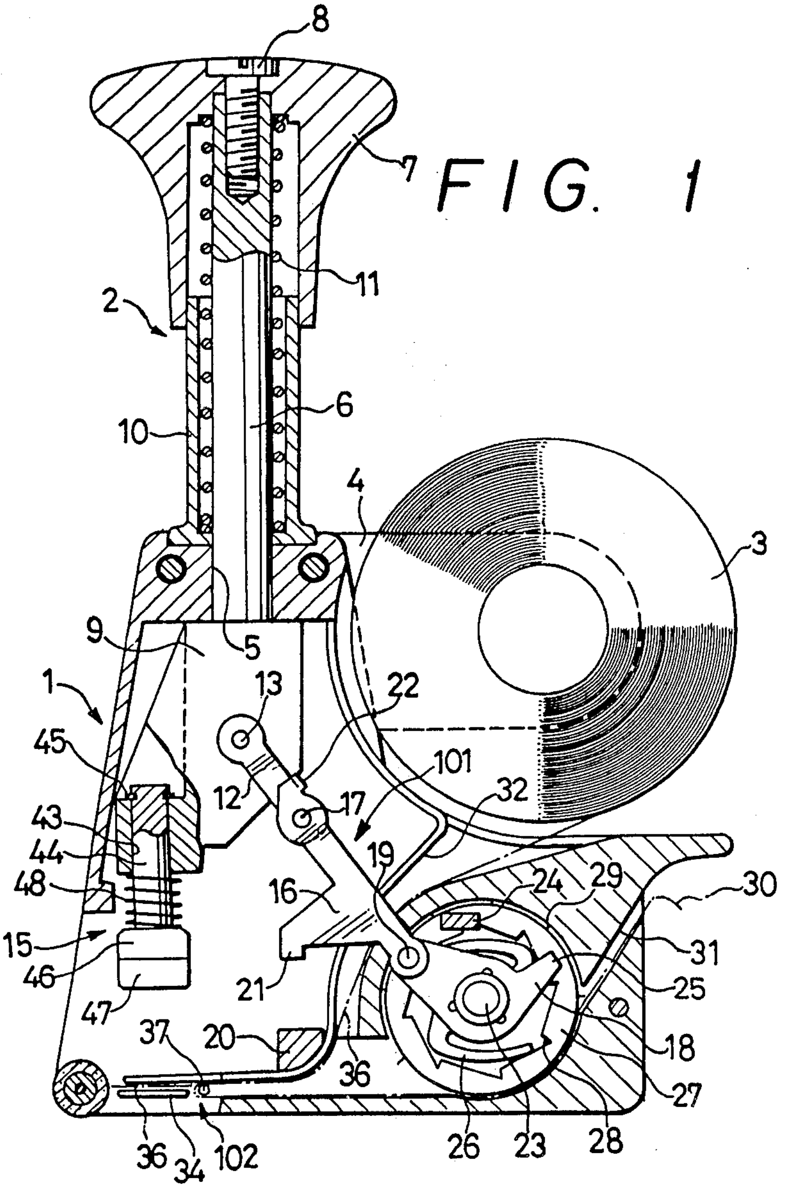
FIG. 1 is a side elevation showing in section the label applying device according to the present invention.
Figure 2:
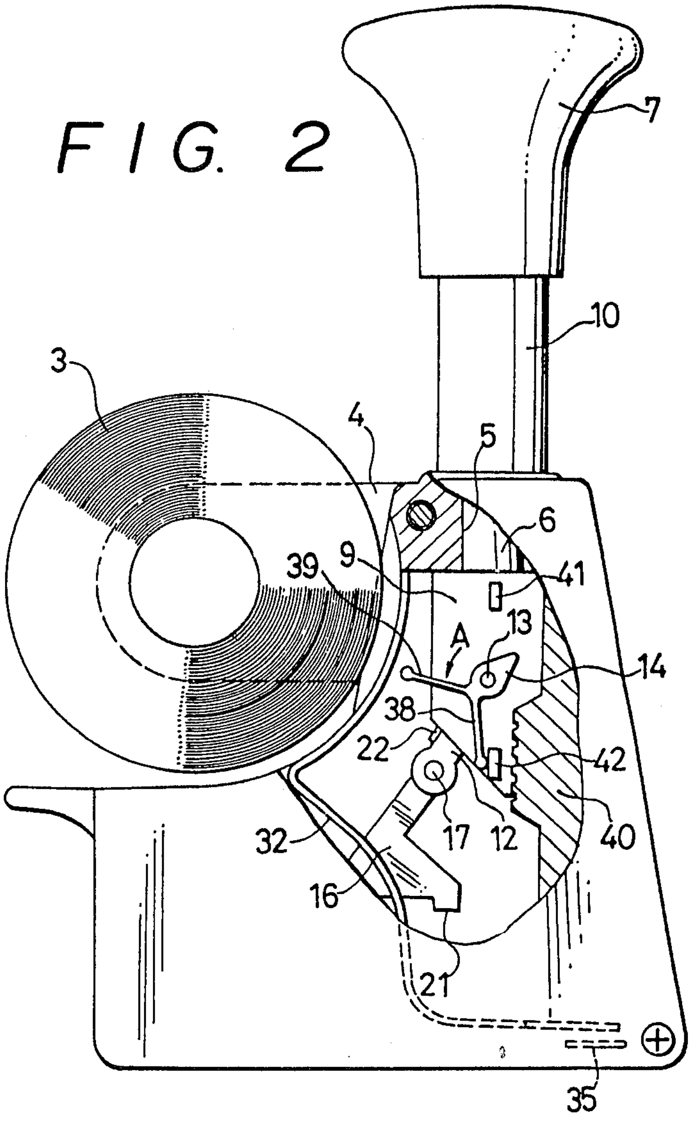
FIG. 2 is a side elevation showing in partial section the label applying device of FIG. 1, but viewed from the opposite side.

The upper portion of a generally box-shaped body 1 of a label applying device tapers upward. As shown in FIGS. 1 and 2, a label application operator 2 is disposed at the upper portion for performing a series of operations for delaminating and applying labels, etc. At the upper right-hand portion of the device body 1, a composite label web 3 is held in a rolled shape on a label holder 4.

The upper portion of the body 1 has a vertical bore 5 through which a vertical grip shaft 6 extends for acting as the shaft of the label application operator 2. A grip 7 is fixed by means of a screw 8 to the upper end of the grip shaft 6. An actuator 9 is fixed to and moves with the lower end of the grip shaft 6.

A cylindrical spring cover 10 is disposed on the upper portion of the body 1 to enclose the grip shaft 6. A return coil spring 11 is disposed under compression around the grip shaft 6 and under the spring cover 10, between the grip 7 and the bottom of the cover 10.

In FIG. 1, a first arm 12 is hinged at one end to a pivot pin 13 which is fixed to the actuator 9 at one side of the actuator. Turning to FIG. 2, a retaining pin 14 is hinged to the other end of that pivot pin 13 at the other side of the actuator 9. Referring to FIG. 1, there is disposed at the left-hand and lower portion of the actuator 9 a label applier 15 for applying labels to articles. At the other end of the first arm 12 from its attachment to the actuator 9, one end of a second arm 16 is hinged by a pivot pin 17. At the other end of the second arm, a rocking member 18 is hinged by a pivot pin 19. The left-hand lower portion of the second arm 16 has a retaining portion 21 which is to be retained by a stopper 20 formed on one side wall of the device body 1. Moreover, the side of one end of the second arm 16 is formed with a retaining portion 22 which engages the first arm 12 and ensures integration between the first and second arms 12 and 16.

The rocking member 18 is rotatably borne on a roller shaft 23 supported on the body 1. The right-hand upper portion of the rocking member 18 is formed with a retaining portion 25 which is to be retained by a stopper 24 formed on one side wall of the body 1. The first and second arms 12 and 16 and the rocking member 18 together form a link mechanism 101.

A pair of pawls 26 are mounted on the roller shaft 23 inside of the rocking member 18. A feed roller 27 is rotatably borne on the roller shaft 23 at such a position as to internally contact the circumferential edges of the pawls 26. The feed roller 27 has ratchet teeth 28 formed on its inner circumference, and the teeth are shaped and sized to engage with the pawls 26. The feed roller 27 has a plurality of feed teeth 29 formed on its outer circumference. These are sized and positioned to engage the composite label web 3 to feed it. At the right of the feed roller 27, there is an outlet 31 from the body, from which the paper web 30 backing the composite label web 3 is discharged to the outside.

A label guide plate 32 is formed at the other side wall about the center of the body 1. The label web passes along under the label guide plate. The plate 32 guides the composite label web 3 below the applier 15. Below and opposite the applier 15, there are formed a pair of label supporting plates 34 and 35 arranged side-by-side and respectively supported on both side walls of the body 1.

At the right of the supporting plate 34, there is disposed a label delaminator 102, which is comprised of a label turning pin 37, for example, for delaminating the labels 36 of the composite label web 3 one-by-one from their backing paper web 30 as the composite web is drawn over and then turned back around the pin 37.

The following description is directed to the retaining pin 14. As shown in FIG. 2, the retaining pin 14 has a nose at one side of the pin 13 and is formed with first and second abutments 38 and 39 at the other side of the pin 13 and which are expanded in a bifurcated shape. The other, opposing side wall of the body 1 is formed with a rack 40 which is engageable with the nose of the retaining pin 14. A pair of stoppers 41 and 42 are formed on the actuator 9. These are spaced above and below the retaining pin 14 so as to abut against the first and second abutments 38 and 39, respectively. The retaining pin 14 is always elastically biased in the direction of arrow A by a spring (not shown).

The applicator 15 is now described. Referring to FIG. 1, the actuator 9 is formed with a bore 43 at its underside, through which an applier shaft 44 slidably extends. A washer 45 is mounted on the upper end of the applier shaft 44 for preventing the applier shaft 44 from moving down out of the bore 43. A suspending member 46 is fixed to the lower end of the applier shaft 44 by means of a screw (not shown). An applying pad 47, which is made of rubber, for example, is fixed to the lower side of that suspending member 46, for applying the labels 36. A coil spring 48 is held under compression between the actuator 9 and the suspending member 46 for urging the member 46 downwardly and for establishing the pressure of the pad 47.

The operation of the present invention is described with reference to FIGS. 1 and 2, together with FIGS. 3 and 4. The label holder 4 is charged with the composite label web 3 in rolled form. The composite label web 3 is unrolled below the guide plate 32 and is reversed in direction around the label turning pin 37. The labels are here delaminated from the backing paper and are fed forward beneath the applying pad. The backing paper of the composite label web 3 is turned back and is passed below the toothed roller 27 until it comes out of the outlet 31. This sets the composite label web 3 in the label applying device.

To apply the labels to articles, the grip 7 is first depressed against the bias of the return coil spring 11. This lowers the first and second arms 12 and 16, together with the pivot pin 13 carried on the actuator 9, from the position shown in FIG. 3(*a*) to the position shown in FIG. 3(*b*), so that the rocking member 18 is rotated counterclockwise. Then, when the retaining portion 21 on the arm 16 abuts against the stopper 20 and when the retaining portion 25 on the member 18 abuts against the stopper 24, both the downward movement of the second arm 16 and the rotation of the rocking member 18 are stopped by those respective abutments. Through the rotations of the rocking member 18, the pawls 26 are also rotated counterclockwise, and they engage with the ratchet teeth 28 to rotate the feed roller 27, thereby to advance the backing paper web 30 to the outlet 31.

One of the labels 36 is completely delaminated from the backing paper web 30 at the label turning pin 37. That label is separately fed to advance to the left onto the supporting plates 34 and 35.

Figure 3:
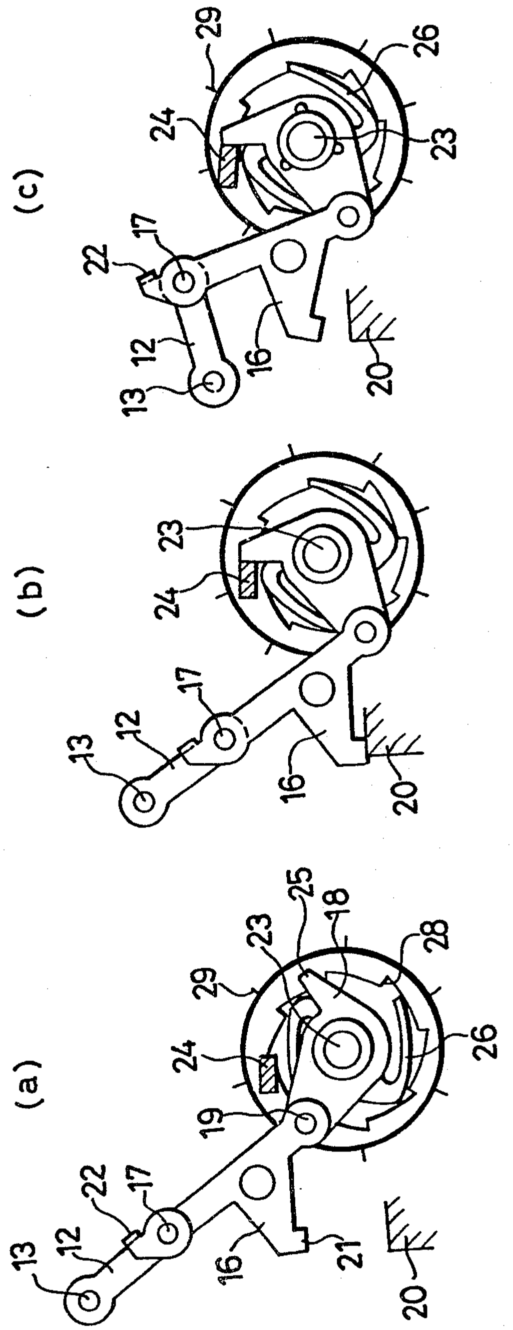
FIG. 3(*a*) is a schematic side elevation showing the operating mode of a link mechanism of the label applying device.

When the grip 7 is further depressed, the first arm 12 swings counterclockwise on the pivot pin 17 with respect to the second arm 16, as shown in FIG. 3(*c*). Moreover, since the pivot pin 13 is lowered as it moves in the same direction as the grip 7, the label 36 on the supporting plates 34 and 35 is pushed down by the applying pad 47 until the label is applied to an article. The coil spring 48 causes a proper pressure to be exerted upon the label 36 until the label 36 is applied to the article.

Next, upon the release of the depressing force applied to the grip 7, the grip 7 is returned up to its initial position by the return coil spring 11. At the same time, the link mechanism 101 is restored to its initial position shown in FIG. 3(*a*).

The operation of the retaining pin 14 is now described. When the grip 7 is first depressed, the retaining pin 14 in the position of FIG. 4(*a*) is carried down together with the actuator 9 toward the position of FIG. 4(*b*). Simultaneously as the pawls 26 mesh with the ratchet teeth 28, the nose of the retaining pin 14 slides over and along and comes into meshing engagement with the rack 40. At this state, even if the depressing force that was applied to the grip 7 is released, the actuator 9, having been moved down, cannot be returned to its initial position, even under the biasing force of the return coil spring 11, because of the cooperation of the retaining pin 14 and the toothed rack 40.

Figure 4:
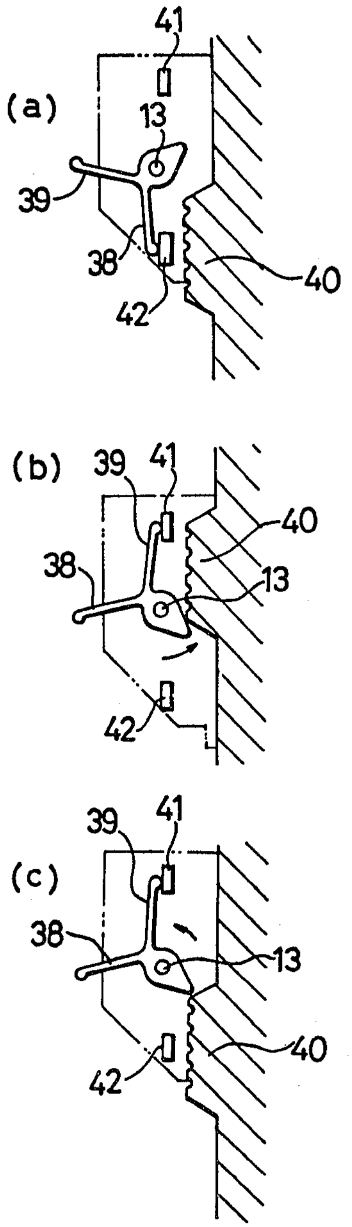
FIGS. 4(*a*), 4(*b*) and 4(*c*) are a series of schematic side elevations showing the operating modes of a retaining pin of the label applying device shown in FIGS. 1 and 2.

The retaining pin 14 cannot be released from engagement with the teeth of the rack 40 before the grip 7 is further depressed and the nose of the pin 14 moves under the rack 40, the position of FIG. 4(*b*). This ensures that the applying pad 47 pushes down upon the label 36 which has already been applied to the article. Moreover, when the actuator 9 is now raised back by the action of the return coil spring 11, after the label 36 has been applied, the retaining pin 14 is also carried upward from the position of FIG. 4(*b*) to restore its initial position. The retaining pin 14, having finished its rise, is turned by a spring in the counterclockwise direction, from the position of FIG. 4(*c*), until it restores its initial operating position shown in FIG. 4(*a*).

As has been described hereinbefore, according to the present invention, labels can be delaminated from their backing paper web and the delaminated labels can be applied to the articles manually in a single action.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A label applying device comprising:

a main body; an actuator movable with respect to the body between an initial position and a label application position; an operator connected with the actuator for being operated to move the actuator between the positions thereof;

a label applier carried on the actuator and movable upon movement of the actuator to a position to contact a label to be applied; the label applier being movable in the application position of the actuator to press a label supported beneath the label applier against an article to be labeled;

a label feed mechanism for feeding labels to be applied beneath the label applier; the label feed mechanism being connected with the actuator for being operated to feed a label beneath the label applier upon movement of the actuator between the positions thereof;

a link mechanism pivotally connected to the actuator for pivoting with respect thereto as the actuator moves between the positions thereof; the label feed mechanism including a feed roller which is supported in the body for rotation to feed labels off a wound roll of labels on the feed roller; the link mechanism being connected with the feed roller for moving the feed roller to rotate as the actuator moves between the positions thereof;

the link mechanism includes a first arm pivotally connected to the actuator, a second arm pivotally connected to the first arm at a location spaced from the location where the first arm is connected to the actuator, a rocking member rotatably supported on the body and being connected to the second arm at a location spaced from the connection between the first and second arms, whereby the rocking member is rotated on the body under the influence of the link mechanism as the actuator moves to move the link mechanism; the rocking member being connected with the feed roller for rotating the feed roller as the rocking member rotates.

2. The label applying device of claim 1, wherein the feed mechanism includes a roller shaft; the feed roller and the rocking member both being rotatably supported on the roller shaft.

3. The label applying device of claim 2, wherein the roller shaft is supported to the device body; a pawl mounted on the roller shaft for rotating therewith; the feed roller having an internal opening therein with an internal circumference including a plurality of ratchet teeth formed therein; the pawl being engageable with the ratchet teeth, such that rotation of the roller shaft in one direction rotates the pawl to rotate the feed roller in the one direction.

4. The label applying device of claim 3, further comprising stopper means placed on the device body for being engaged by the rocking member for controlling the extent of rotation of the rocking member, thereby to cause rotation of the rocking member sufficient to move one label at a time beneath the label applier.

5. The label applying device of claim 4, wherein the label applier is so positioned on the actuator that upon engagement of the rocking member with the stopper means, which prevents further rotation of the rocking member, the label applier is spaced from a position where it may press upon a label supported beneath the label applier and the actuator is still spaced from the label application position; the pivot connection between the first and second arms enabling the first arm to pivot with respect to the second arm for permitting the actuator to move to the label application position while the rotation of the rocking member is stopped by the stopper means.

6. The label applying device of claim 5, further comprising second stopper means formed on the device body for being engaged by the second arm before the actuator has moved to the label application position, for halting further movement of the second arm as the actuator moves to the label application position, and the first arm thereafter moving together with the actuator and pivoting with respect to the second arm as the actuator moves to the label application position.

7. The label applying device of claim 1, further comprising locking means for locking the actuator against return to the initial position thereof once the actuator has moved from the initial position toward the label applying position, until the label applier presses on a label for applying it.

8. The label applying device of claim 1, wherein the locking means includes a retaining pin pivotally carried on the actuator and includes engageable means on the device body for being engaged by the retaining pin, the retaining pin being positioned on the actuator such that upon movement of the actuator from the initial position thereof, the retaining pin engages the engageable means on the device body and the retaining pin being rotated with respect to the actuator to thereafter engage the engageable means and block reverse movement of the actuator, the engageable means being so shaped that upon movement of the actuator to the label applying position, the retaining pin moves free of the engageable means sufficiently to free the retaining pin to pivot to a position where the retaining pin no longer engages the engageable means for preventing return of the actuator to the initial position, and this frees the actuator to return to the initial position thereof.

9. The label applying device of claim 1, wherein the labels are in the form of a series of labels applied to a paper web; the feed mechanism feeding labels by moving the paper web; the device further comprising delaminating means for delaminating the labels one-by-one from the paper web; the delaminating means being located in the path of movement of the paper web prior to the position where the label applier contacts each label to be applied.

10. The label applying device of claim 9, wherein the feed mechanism is for sequentially feeding the composite label web, one label at a time, during each movement of the actuator from its initial, to its application position, and back again.

11. The label applying device of claim 10, wherein the operator connected with the actuator includes a grip adapted to be manually depressed toward the body and a return spring for biasing the grip away from the body and the grip being connected with the actuator for moving the actuator from the initial position thereof toward the label applying position thereof when the grip is pressed toward the body.

12. The label applying device of claim 11, wherein the actuator is fixedly attached to the grip to move therewith.

13. The label applying device of claim 12, wherein the label applier includes an applying pad of flexible material supported from the actuator and movable, by movement of the actuator to the label applying position, into engagement with a label supported on the device body for engaging the label and pressing the same against an article.

14. The label applying device of claim 13, wherein the label applier includes an applier shaft which is movably attached to the actuator for moving with respect to the actuator; the applying pad being supported to the applier shaft for moving therewith; biasing means between the actuator and the applier shaft for normally urging the applier shaft to move the applying pad to press against the label to be applied.

15. The label applying device of claim 14, wherein the biasing means comprises a coil spring compressed between the actuator and the applying pad for applying force to the applying pad.

16. The label applying device of claim 15, further comprising means on the applier shaft and connected with the actuator for preventing the applier shaft from separating from the actuator under the influence of the spring acting on the applier.

17. The label feed device of claim 10, further comprising means on the feed roller for engaging the backing paper web for moving the backing paper web to feed the label strip.

18. The label applying device of claim 17, wherein the label feed mechanism comprises feed teeth formed on the outer circumference of the feed roller and engageable with the backing paper web.

19. The label applying device of claim 9, wherein the label delaminator comprises a means supported on the body about which the backing paper web may be moved in a reverse direction for separating the backing paper web from the labels laminated thereto and the feed mechanism being positioned to engage the backing paper web to pull the backing paper web away from the delaminator, thereby to complete the separation of the labels from the backing paper web before the labels reach the label applier.

20. The label applying device of claim 19, further comprising label supporting means on the device body positioned for receiving a label which has been delaminated from the backing paper web at the delaminator and for temporarily supporting the label at a location beneath the label applier, whereby the label applier may contact the label supported on the label supporting means for thereafter applying the label to an article to be labeled.

21. The label applying device of claim 8, wherein the engageable means includes a rack supported on the body and the retaining pin is pivotally carried on the actuator and includes a part thereof which extends into engagement with the rack; the retaining pin being of a length such that it has a first pivot orientation where it permits the actuator to move from the initial position toward the label applying position thereof while it engages the rack to preclude return movement of the actuator, and the retaining pin is pivotable to a second position at which it may slide along the rack and thereby not block return of the actuator to the initial position thereof.

22. The label applying device of either of claim 8, wherein the retaining pin includes an engagement part which engages the engageable means and includes two arms separated from the engagement part; separated first and second stoppers carried on the actuator respectively for the first and second arms of the retaining pin and the stoppers being so placed that in the first pivot position of the retaining pin, the first arm engages the first stopper and the retaining pin is prevented from pivoting further in that direction, while in the second pivot position, the second arm engages the second stopper and the retaining pin is prevented from rotating further in that direction, and the first and second stoppers being so spaced apart as to permit the retaining pin to pivot between the first and second positions thereof.

* * * * *